(12) United States Patent
Gregory

(10) Patent No.: US 10,053,295 B2
(45) Date of Patent: Aug. 21, 2018

(54) PARTS ORGANIZING SYSTEM AND METHOD

(71) Applicant: Faurecia Interior Systems, Inc., Auburn Hills, MI (US)

(72) Inventor: Jonathan Mark Gregory, Highland, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/339,166

(22) Filed: Oct. 31, 2016

(65) Prior Publication Data
US 2018/0118467 A1  May 3, 2018

(51) Int. Cl.
| B65G 25/04 | (2006.01) |
| B65G 27/16 | (2006.01) |
| B65G 27/04 | (2006.01) |
| B65G 47/12 | (2006.01) |
| B65G 47/14 | (2006.01) |

(52) U.S. Cl.
CPC ............ *B65G 27/16* (2013.01); *B65G 27/04* (2013.01); *B65G 47/12* (2013.01); *B65G 47/1407* (2013.01)

(58) Field of Classification Search
CPC .... B65G 47/12; B65G 47/14; B65G 47/1407; B65G 47/1457; B65B 35/08; B65B 35/56; H05K 13/028; B07B 13/04; B07B 13/05
USPC ......... 198/396; 221/167, 168; 209/615, 616, 209/625, 627, 350, 351, 651, 654, 684; 414/757
See application file for complete search history.

(56) References Cited

U.S. PATENT DOCUMENTS

| 2,355,643 | A | * | 8/1944 | Grover ................... B65B 35/56 269/287 |
| 2,654,465 | A | | 10/1953 | Sgriccia |
| 2,682,973 | A | * | 7/1954 | Ballard .............. B65G 47/1457 221/168 |
| 2,833,091 | A | * | 5/1958 | Whitney ................. B65B 15/00 29/DIG. 44 |
| 4,101,054 | A | | 7/1978 | Frost et al. |
| 4,732,296 | A | | 3/1988 | Heck et al. |
| 4,947,982 | A | * | 8/1990 | Miyaki ................. B23P 19/002 198/380 |
| 5,234,127 | A | | 8/1993 | Singer et al. |
| 5,394,670 | A | * | 3/1995 | Visser .................... A01G 9/081 141/125 |
| 8,191,731 | B2 | | 6/2012 | Ota |
| 2006/0185149 | A1 | | 8/2006 | Erdman et al. |

* cited by examiner

*Primary Examiner* — William R Harp
(74) *Attorney, Agent, or Firm* — Reising Ethington P.C.

(57) ABSTRACT

A parts organizer receives small parts such as mechanical fasteners in bulk form and organizes a plurality of the parts in a common desired orientation. Unoriented parts are received on top of a parts holder and subsequently moved along an upper side of the parts holder by an agitator. A plurality of receptacles are formed in the parts holder and open on its upper side. Each receptacle is configured to hold one of the parts in the desired orientation and may include a lead-in feature to help reorient the parts as they encounter the receptacles during movement. A retaining wall operates to contain unheld parts at the upper side of the parts holder during a parts organizing step and to allow the agitator to clear unheld parts away from the upper side of the parts holder during a purge step.

20 Claims, 3 Drawing Sheets

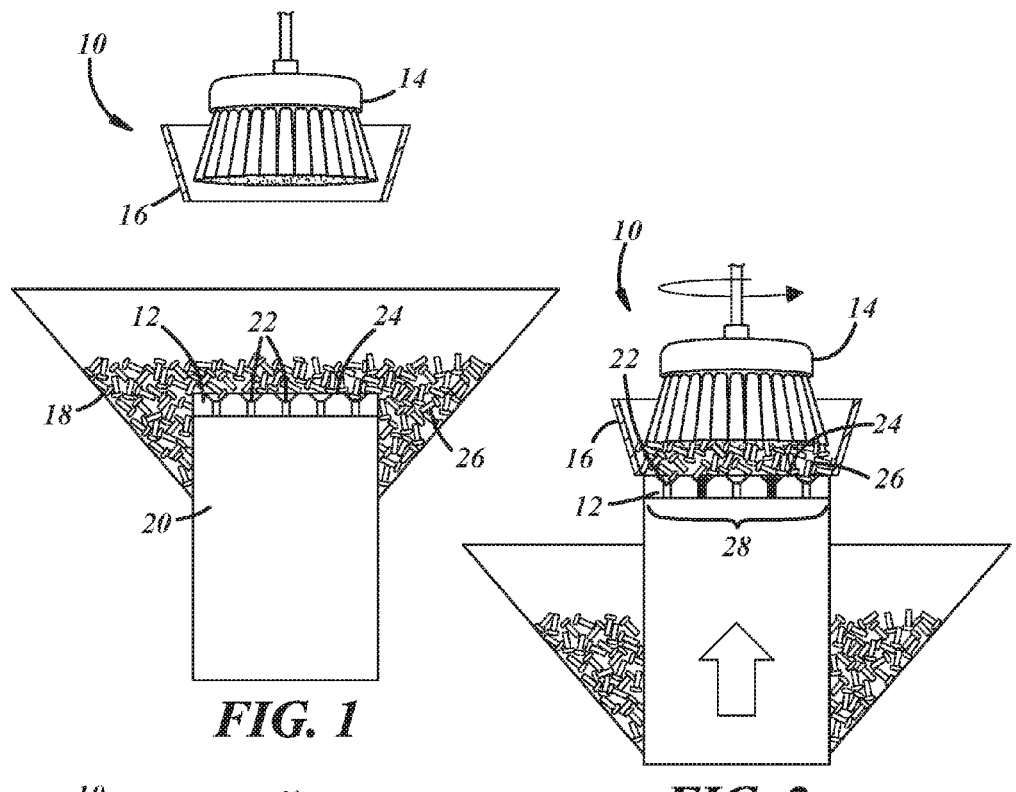
FIG. 1
FIG. 2
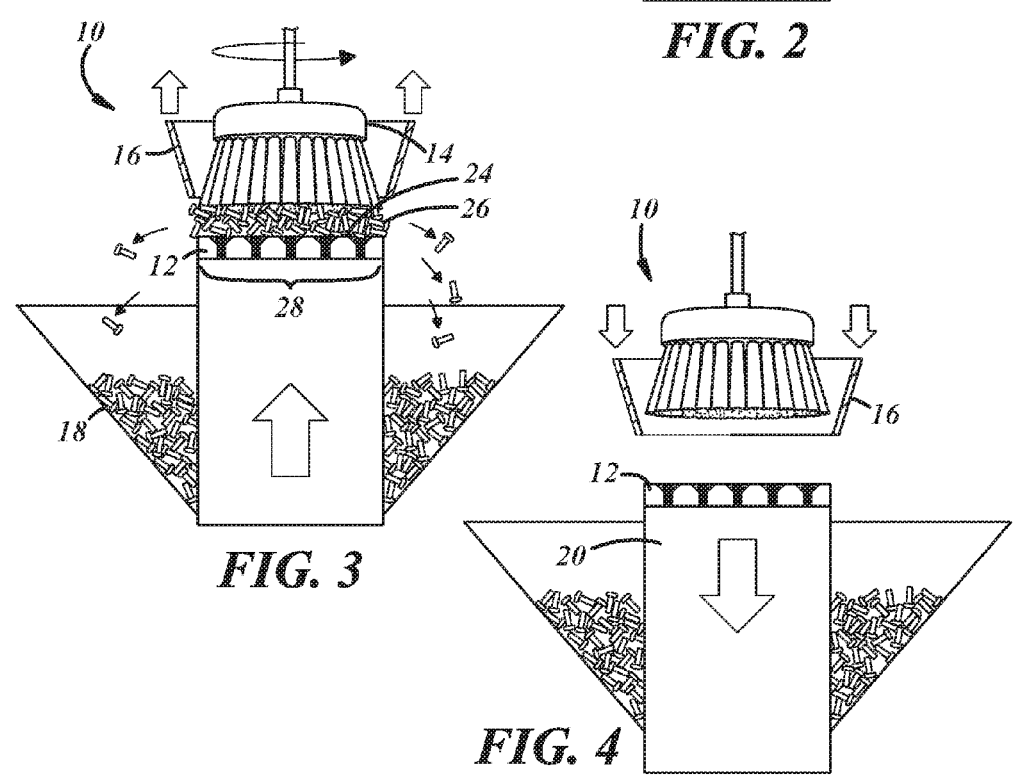
FIG. 3
FIG. 4

PARTS ORGANIZING SYSTEM AND METHOD

TECHNICAL FIELD

This disclosure relates to a system and method for feeding mechanical fasteners and, more particularly, for converting such fasteners from bulk form to an organized form more suitable for subsequent use.

BACKGROUND

Mechanical fasteners are experiencing renewed popularity in the manufacturing industry in assembly operations. This is due in part to various governmental requirements that certain products, such as automobiles, be designed for disassembly at the end of their useful life to facilitate separation of dissimilar materials and thereby promote recycling or reuse of the materials. While there seems to be no end in sight to the innovation of new joining techniques, it has proven difficult to improve on the tried-and-true threaded fastener when it comes to attaching parts together in a way that is robust in the long-term, yet ultimately temporary.

While fastener manufacturers may rejoice in the renewed interest in their wares, the personnel who must use such fasteners in assembly operations will not. Mechanical fasteners have long been a nemesis of assembly line foremen and plant managers the world over. They are small, tedious to handle, and notorious for jamming-up automated manufacturing equipment and causing downtime a cross-threaded or misfed screw can shut down an entire assembly line and quickly eat into the efficiency and profitability of an assembly operation.

One problem with mechanical fasteners is the bulk form in which they are typically delivered and/or stored prior to use. Fasteners are typically piled together randomly in a bin or box by the hundreds, thousands, or tens of thousands. At some point during the life of an individual mechanical fastener, it must be reoriented from its randomly acquired storage orientation to a desired orientation for use. To achieve this, vibratory bowl feeders have become ubiquitous fixtures in assembly operations. British Patent No. 993,645 to Hoefliger et al. discloses an example of a vibratory bowl feeder that consists of a round bowl with a narrow ramp spiraling up the inner wall of the bowl. As the bowl vibrates, the parts to be fed are conveyed up the ramp from an end in or near the bulk fasteners and arrive at a dispensing end near the top of the bowl in a single-file arrangement. These bowls usually include orienting features (e.g., angled protrusions, openings in the ramp, etc.) located along the ramp that are designed to reorient passing fasteners and/or send misoriented fasteners back to the bottom of the bowl for refeeding.

While such feeders offer some advantages over manual sorting and placement, they come with their own sets of problems. For one, each bowl feeder is specifically designed for one particular fastener size and geometry, any fastener change thus requires a new feeder bowl design. Vibratory feeders are also infamous for becoming jammed, due to an inevitable burr or other imperfection or a stray fastener of different size or geometry. Indeed, assembly plants with large numbers of bowl feeders often have personnel dedicated to clearing jams. There are also physical limitations on the speed at which fasteners can be fed by these devices.

SUMMARY

In accordance with one embodiment, a parts organizer for organizing a plurality of randomly oriented parts includes a parts holder having an upper side and a plurality of receptacles opening on said upper side. Each one of the receptacles is configured to receive and hold an individual one of the parts in a desired orientation and in spaced relation from other individual ones of the parts being held in the desired orientation by respective different ones of the receptacles. The parts organizer also includes an agitator and a retaining wall. The agitator is operable to move parts from the plurality of randomly oriented parts that are not held by one of the receptacles in the desired orientation along the upper side of the parts holder. The retaining wall is configured to retain unheld parts at the upper side of the parts holder while the agitator moves the unheld parts along the upper side of the parts holder.

In one or more embodiments, the parts holder is removable from the organizer when each one of the receptacles is holding one of the parts.

In one or more embodiments, the organizer includes a container that contains the plurality of randomly oriented parts in bulk form, and the parts holder is configured to receive at least some of the plurality of randomly oriented parts at the upper side of the parts holder to be moved along the upper side of the parts holder by the agitator.

In one or more embodiments, the parts holder and agitator are moveable relative to one another between a parts receiving condition and a parts organizing condition. In the parts receiving condition, at least some of the plurality of randomly oriented parts are received at the upper side of the parts holder. In the parts organizing condition, the agitator operates to move unheld received parts along the upper side of the parts holder.

In one or more embodiments, the agitator does not touch the parts received at the upper side of the parts holder when in the parts receiving condition, and the agitator touches the parts received at the upper side of the parts holder when in the parts organizing condition.

In one or more embodiments, the organizer includes a container that contains the plurality of randomly oriented parts in bulk form. The parts holder is movable relative to the container, and at least a portion of the upper side of the parts holder is immersed in the plurality of randomly oriented parts in the container when in the parts receiving condition and not immersed in the plurality of randomly oriented parts in the container when in the parts organizing condition.

In one or more embodiments, the agitator is configured to physically contact the unheld parts that the agitator moves along the upper side of the parts holder.

In one or more embodiments, the agitator is non-vibrational.

In one or more embodiments, the agitator comprises a brush having bristles that move with respect to the parts holder to apply forces to the unheld parts that the agitator moves along the upper side of the parts holder.

In one or more embodiments, the agitator rotates about an axis in a rotational direction and moves the unheld parts along the upper side of the parts holder in the rotational direction.

In one or more embodiments, the retaining wall is round and concentric with the axis of the agitator.

In one or more embodiments, the retaining wall is changeable between a closed position, in which the retaining wall retains unheld parts at the upper side of the parts holder while the agitator moves the unheld parts along the upper side of the parts holder, and an open position, in which the agitator operates to move unheld parts at the upper side of the parts holder off of the upper side of the parts holder.

In one or more embodiments, each of the parts has a first end and a smaller second end, and each one of the receptacles has a first portion at the upper side of the parts holder and a second portion extending away from the first portion toward an opposite side of the parts holder. Each second portion is sized to exclude the first ends of the parts and to allow one of the second ends of the parts to extend into the second portion to be held in the respective receptacle in the desired orientation, thereby preventing movement of held parts out of the receptacles when the agitator operates to move unheld parts along the upper side of the parts holder.

In one or more embodiments, the parts are mechanical fasteners each having a head at the first end and a coaxial shaft extending from the head toward the second end. The second portion of each receptacle includes a tubular passage, and the first portion of each receptacle includes a chamfer having a depth greater than an axial length of the heads of the fasteners so that the head of a fastener held in the desired orientation lies below an upper surface of the parts holder.

In accordance with another embodiment, a method of organizing parts includes the steps of: providing a parts holder comprising a plurality of receptacles opening on an upper side of the parts holder; receiving a plurality of the parts at the upper side of the parts holder, wherein each part has an elongate axis and at least one of the parts is received with the elongate axis in a non-vertical orientation; moving said at least one of the parts along the upper side of the parts holder; and reorienting said at least one of the parts at an empty one of the receptacles so that the elongate axis of each reoriented part is in a vertical orientation and each reoriented part fills one of the receptacles.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein:

FIG. 1 is a schematic side view of an example of a parts organizer illustrated in a parts receiving condition;

FIG. 2 is a schematic side view of the parts organizer of FIG. 1 illustrated in a parts organizing condition;

FIG. 3 is a schematic side view of the parts organizer of FIGS. 1 and 2 illustrated in a purge condition;

FIG. 4 is a schematic side view of the parts organizer of FIGS. 1-3 illustrated in an unloading condition;

DETAILED DESCRIPTION OF ILLUSTRATIVE EMBODIMENT(S)

Figure 5:
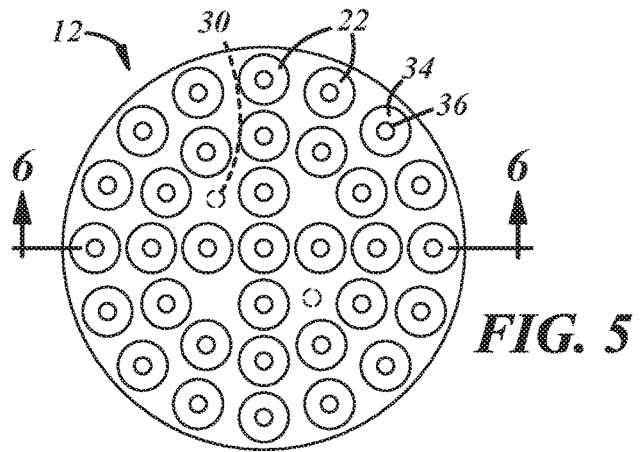
FIG. 5 is a top view of an embodiment of a parts holder of the parts organizer.

The parts organizer described below represents a new approach to feeding small parts such as mechanical fasteners that are received in bulk form to an assembly line or cell in an organized fashion. The parts organizer does not rely on low amplitude vibrations or single-file organization schemes typically employed in vibratory feeder bowls, and its feeding rate is therefore not limited by such characteristics. The system and methods described herein can be scaled to organize and reorient anywhere from only a few to several hundred or several thousand small parts in the same amount of time. Further, the same organizer can be used to organize and feed parts of different shapes and sizes and/or to organize the same parts into multiple different pre-determined patterns by simple design or selection of a different parts holder for each cycle or each new type of fastener. While the illustrated embodiments are presented in the context of organizing threaded fasteners such as screws or bolts, adaptation for use in organizing nearly any small part having an elongate axis springs, dowel pins, nails, rivets, etc.) is contemplated.

FIGS. 1-4 are schematic side views of an embodiment of a parts organizer 10 that includes a parts holder 12, an agitator 14, a retaining wall 16, a bulk parts source 18, and a holder support 20. The parts holder 12 includes a plurality of part receptacles 22 opening on its upper side 24. Each receptacle 22 is configured to hold an individual one of the parts 26 to be organized in a desired orientation. The illustrated bulk parts source 18 is a bowl-shaped container containing a plurality of the parts 26 in bulk form.

The parts holder 12 is moveable between a first position and a second position in which its upper side 24 is respectively immersed (FIG. 1) and not immersed (FIG. 2) in the bulk parts. The agitator 14 is a rotating bristle brush in this example and is operable to move unheld parts 26 along the upper side 24 of the parts holder 12 until the receptacles 22 are filled with parts in the desired orientation. The retaining wall 16 is moveable between a closed position, in which it contains unheld parts 26 at the upper side 24 of the holder 12 during agitation (FIG. 2), and an open position, in which it permits unheld parts at the upper side of the holder to be moved off of the parts holder (FIG. 3). In this manner, the parts organizer 10 converts a plurality parts from various random orientations to a common desired orientation and arranged with respect to each other in a desired pattern in the parts holder 12. Where the parts 26 are mechanical fasteners, the filled parts holder 12 can be used by a manufacturing assembly cell to provide the fasteners to the cell at pre-programmed cell coordinates corresponding to the pattern of receptacles 22 and with the heads of the fasteners all accessible from the top of the parts holder, eliminating the need for and the problems associated with vibratory bowl feeders.

FIG. 1 illustrates the parts organizer 10 in a parts receiving condition in which some of the parts to be organized are received at the upper side 24 of the parts holder. In the illustrated example, parts 26 are received by immersion in the bulk parts in the container 18—i.e., with the upper side 24 below an upper boundary of the bulk parts. Other parts receiving conditions are possible, such as a condition in which a bulk parts source pours parts onto the upper side 24 of the parts holder 12 from above. For instance, FIG. 2 could represent a parts receiving condition of the organizer with parts being supplied from the top of and within the retaining wall 16. The number of parts 26 received may be greater than the number of receptacles 22 to increase the efficiency of the organizing process. The magnitude of the difference in the number of parts received in the receiving condition and the number of receptacles 22 may vary; but the number of received parts is generally at least double that of the number of receptacles and may be up to an order of magnitude more than the number of receptacles. In the illustrated embodiment, the received parts 26 are arranged in a layer of randomly oriented and partially overlapping parts with the layer thickness in a range between the smallest and largest dimension of an individual part.

FIG. 2 illustrates the parts organizer 10 in a parts organizing condition in which unheld parts 26 are moved along the upper side 24 of the parts holder 12 by the agitator 14. The retaining wall 16 is in the closed position and retains unheld parts at an agitation area 28 defined along the upper side 24 of the parts holder 12 while the agitator 14 operates. The agitation and movement provided by the illustrated bristle brush differs from that provided in conventional bowl feeders in several respects. For one, the movement can be provided without intentional and controlled vibration of the container 18. Also, the movement is provided by application of a force to each unheld part 26 by the agitator 14 via physical contact at a location above the surface upon which the part is resting. The applied force is generally parallel to the opposite surfaces of the parts holder (i.e., horizontal). In other words, the agitator 14 sweeps the parts 26 along the upper side 24 of the parts holder. This results in part movement that can be significantly faster than part movement provided by the high frequency and low amplitude vibrations of a conventional bowl feeder. For instance, while a vibratory bowl feeder may move parts along a track at a speed on the order of tens of inches per minute, a rotating brush or other suitable agitator 14 can move parts along the upper side 24 of the parts holder at a speed on the order of thousands of inches per minute.

Other types of agitators are contemplated. For example, the agitator may be configured to provide one or more jets of air within the retaining wall 16 to move the parts along the parts holder 12. Or the agitator may be configured to tilt and/or vibrate the parts holder at relatively large amplitudes (e.g., on the order of inches rather than millimeters) and/or low frequencies (e.g., on the order of a few Hertz or less rather than 50-60 Hz). One objective of the agitator 14 is to quickly move unheld parts 26 among the plurality of receptacles 22 to provide multiple opportunities for each of the unheld parts to encounter an unoccupied receptacle. The higher the number of such opportunities, the higher the probability that one of the encounters will be one in which the part can be received by the receptacle in the desired orientation. The agitator 14 can thus be any component that moves unheld parts along the upper side 24 of the parts holder 12 among more than one of the receptacles 22.

FIG. 3 illustrates the parts organizer 10 in a purge condition in which unheld parts 26 are removed from the upper side 24 of the parts holder 12. In this example, the retaining wall 16 changes to the open position from the closed position of FIG. 2, and continued operation of the agitator 14 sweeps any unheld parts 26 off of the parts holder 12 and back into the bulk parts in the container 18. Other purge conditions are possible, such as movement of the agitator 14 and parts holder 12 away from each other with other means of removing the unheld parts being employed (e.g., manual, air jets, tilting, etc.). Also, other types of retaining walls 16 are contemplated. For example, the retaining wall 16 may be configured so that only a portion of the wall opens or moves away from the closed position to allow unheld parts to exit its confines.

FIG. 4 illustrates the organizer 10 in an unloading condition, in which the parts holder 12 is accessible to be lifted off of the support 20 or otherwise removed from the organizer. In this example, the parts holder 12 is in a third position between the first position of FIG. 1 and the second position of FIGS. 2 and 3, but any position at which the parts holder is accessible for removal by man or machine will suffice. A different empty parts holder can be installed on the support 20 at this same condition, or at a different organizer condition with one or more components of the organizer 10 in a different relative location. FIG. 4 shows the retaining wall 16 returned to the closed position of FIG. 2, but this can be done any time before a subsequent parts organizing step. After an empty parts holder is installed, the organizer can be returned to the parts receiving condition to repeat the parts organizing process.

The different conditions of the parts organizer 10 illustrated in FIGS. 1-4 are only illustrative. The organizer 10 can be configured with the illustrated components moveable relative to one another in different ways or with some of the above-listed conditions being the same as one another. In the illustrated example, the agitator 14 and the container 18 are stationary, the parts holder 12 and support 20 are vertically moveable together, and the retaining wall 16 is independently moveable. Alternatively or additionally, the agitator 14 and/or the container 18 could be moveable or the parts holder 12 and/or the retaining wall 16 could be stationary to achieve various organizer conditions. In another variation, the agitator 14 can be stationary while in the parts organizing condition and move the parts along the parts holder via rotation or other movement of the parts holder. Relative component movement can be achieved by known methods, such as hydraulic or pneumatic cylinders, solenoids, or servo motors, and movement is not limited to vertical movement.

Other embodiments may have the various organizer components in relative positions different from those illustrated in each of the receiving, organizing, purge, and unloading conditions. For example, starting with the receiving condition of FIG. 1, the agitator 14 could be lowered into the container 18 with the parts holder 12 remaining immersed in the bulk parts to achieve another example of the parts organizing condition, after which the parts holder and agitator could be raised out of the bulk parts to achieve the purge condition. In another example, the purge condition and the unloading condition are identical, with the parts holder 12 being removable from the support 20 in a side-to-side direction with no further vertical clearance necessary.

As noted above, the disclosed organizer 10 is useful for organizing not only mechanical fasteners, but nearly any small part having an elongate axis. An exemplary method of organizing parts having an elongate axis may thus include the steps of receiving parts 26 at the upper side 24 of the parts holder 12 with randomly oriented elongate axes, and subsequently reorienting the received parts with the elongate axes in the desired orientation in the receptacles 22 of the parts holder. As discussed further below, the receptacles 22 can be configured to assist in reorienting parts 26 from random orientations to the desired orientation during operation of the agitator 14.

Figure 6:
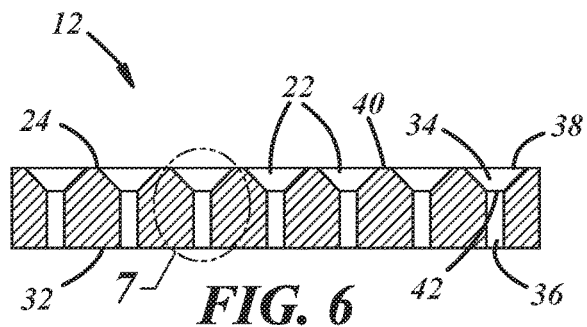
FIG. 6 is a cross-sectional view of the parts holder of FIG. 5.

FIG. 5 is a top view of an exemplary parts holder 12, and FIG. 6 is a cross-sectional view of the parts holder of FIG. 5. The parts holder 12 has a plurality of receptacles 22 opening on the upper side 24 of the parts holder. Each one of the receptacles 22 is configured to hold an individual part in a desired orientation and in spaced relation from other parts being held in the desired orientation by other receptacles. In this particular example, the parts holder 12 is a plate, and each receptacle 22 is a hole formed through the plate and countersunk at its upper side 24. As further explained below, the countersink feature can help reorient parts being moved along the upper side 24 of the holder 12 from an undesired orientation to the desired orientation.

The receptacles 22 are arranged along the parts holder in a desired pattern. In this particular example, the parts holder 12 is round with one receptacle 22 at its center and each of the other receptacles having a center lying along one of three concentric circles. The resulting pattern is uniform and has multiple lines of symmetry. Other uniform patterns may include a hexagonal close-packed pattern or an array of linear columns and rows. The pattern need not be uniform or regular, however. In some cases, each receptacle 22 simply has a known location with respect to an origin or other reference location of the parts holder 12 so that subsequent automated equipment can be programmed to retrieve individual organized parts from the filled parts holder.

The illustrated parts holder 12 also includes attachment features 30 in the form of dowel holes formed in a lower side 32 of the holder that facilitate removable attachment to the above-described holder support 20 (not shown in FIGS. 5-6) via locator pins. The parts holder 12 may be otherwise configured for removable attachment, preferably in a quick-release fashion such as magnetic or vacuum attachment or a keyed hub to allow the parts holder 12 to be easily lifted off of the support and easily replaced with another parts holder having the same or different pattern of receptacles 22.

Each illustrated receptacle 22 has a first portion 34 that opens on the upper side 24 of the parts holder 12 and a second portion 36 extending from the first portion. The first portion 34 extends at least partly through the thickness of the parts holder 12 from a first end 38 at an upper surface 40 of the holder 12 to an opposite second end 42. The second portion 36 extends from the second end 42 of the first portion 34 toward the lower side 32 of the parts holder 12. In this example, the first portion 34 is the countersink portion of each countersunk hole, and the second portion 36 is the cylindrical portion of each hole. The receptacles 22 need not extend entirely through the holder 12, and the second portion 36 may be omitted in some cases.

The first portion 34 may be referred to as a lead-in and functions by working with gravity to change the orientation of unheld parts along the upper side 24 of the parts holder 12 as the agitator moves the unheld parts therealong. In particular, when an unheld part moving along the upper side 24 of the parts holder encounters the lead-in 34 of one of the receptacles 22, the elongate axis of the part may be tilted toward a vertical orientation as explained further below.

Figure 7:
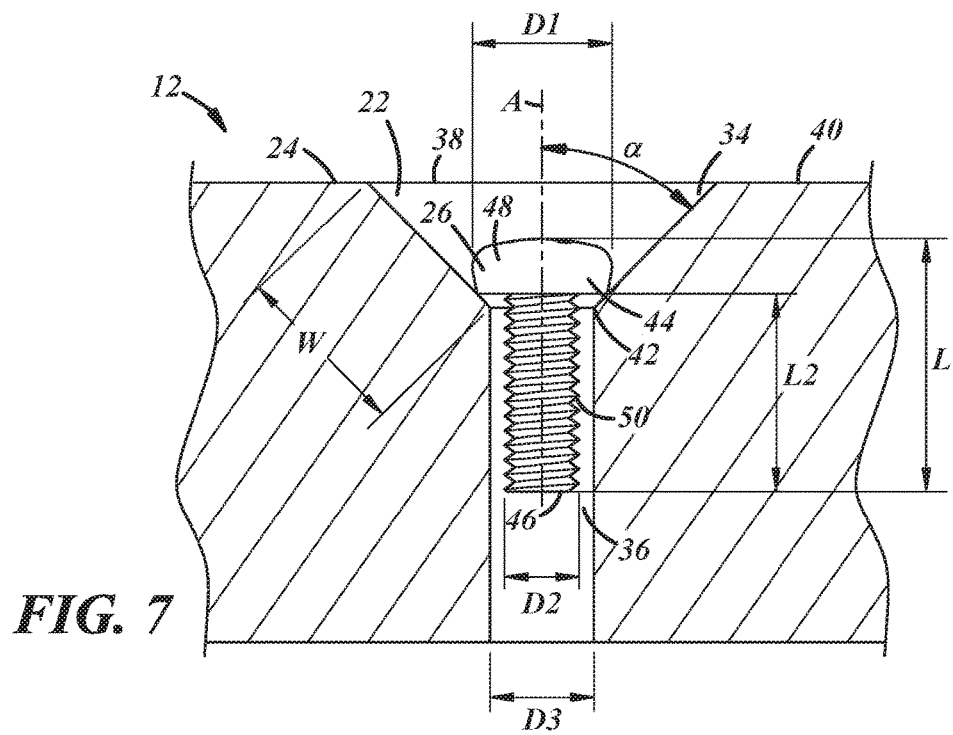
FIG. 7 is a partial cross-sectional view of the parts holder of FIG. 5 with a mechanical fastener held in a receptacle of the parts holder.

FIG. 7 is a partial cross-sectional view of the parts holder 12 of FIG. 5 illustrating an exemplary mechanical fastener part 26 being held in the desired orientation in one of the receptacles 22. As used herein, a "held" part 26 is one that is in the desired orientation in one of the receptacles 22 such that at least one of the surfaces defining the receptacle prevents the part from being moved out of the desired orientation by the operating agitator. All other parts are considered unheld. The elongate axis A of the illustrated part 26 runs through the center of both a first end 44 and a second end 46 of the part in a direction parallel with the largest dimension of the of the part, which is the length L of the part 26 in this case. The first end 44 of the part 26 is larger than the second end 46. In this particular case, the part 26 is a machine screw, and the diameter or width D1 of a head 48 at the first end 44 of the screw is greater than the diameter or width D2 of a threaded body 50 extending from the head 48 toward the second end 46. In this example, the desired orientation is with the elongate axis A oriented vertically and with the head 48 of the screw above the threaded body 50 as shown in FIG. 7.

As noted above, each receptacle 22 can be shaped to facilitate the use of gravity to change the orientation of unheld parts being moved along the upper side 24 of the parts holder 12 from an undesired orientation to the desired orientation. Each receptacle 22 is also shaped or otherwise configured to prevent a held part 26 from being moved out of the desired orientation once received. The second portion 36 of the receptacle 22 is sized to receive the second end 46 of the part 26 and, in this case, permit the body 50 of the fastener to extend into the second portion of the receptacle. The second portion 36 of the receptacle 22 is also sized to exclude the first end 44 of the part 26 and, in this case, to prevent the head 48 of the fastener from extending into the second portion of the receptacle. The first portion 34 of the receptacle 22 is sized so that it does not exclude either end 44, 46 of the part 26.

In this embodiment, the second or lower portion 36 of the receptacle 22 is a tubular (e.g., cylindrical) passage having a diameter or width D3 that is less than the diameter or width D1 at the first end 44 of the part 26 and greater than the diameter or width D2 at the second end 46 of the part 26 (D1>D3>D2), thereby excluding the head 48 of the fastener from the passage 36 while permitting the body 50 of the fastener to extend into the passage as shown in FIG. 7.

Also illustrated in FIG. 7 is a lead-in angle α and a wall length W associated with the first portion 34 of the receptacle 22. While the magnitude of these features of the receptacle are not entirely responsible for proper functioning of the lead-in to draw parts into the receptacle to be received and held in the desired orientation, proper functioning of the lead-in is related to these features as described below.

Figure 8:
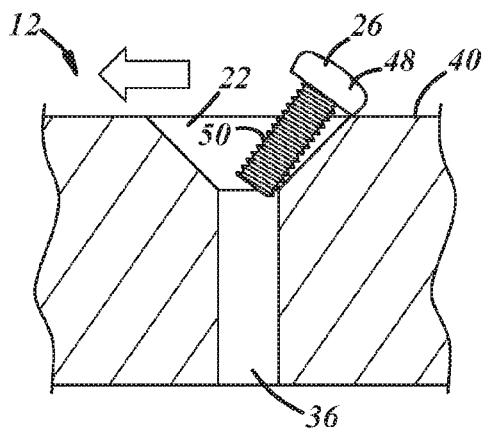
FIG. 8 is the view of the parts holder of FIG. 7 with the mechanical fastener illustrated during movement along an upper side of the parts holder.

FIG. 8 illustrates the screw 26 of FIG. 7 in an unheld condition, with the head 48 of the screw resting on an edge of the receptacle 22 at the upper surface 40 of the parts holder 12 and the body 50 of the screw overhanging the second portion 36 of the receptacle. This represents a critical position of the screw 26 with respect to the receptacle 22 at which any further movement in the direction of the arrow will cause the screw to fall into the receptacle to be received and held there.

Figure 9:
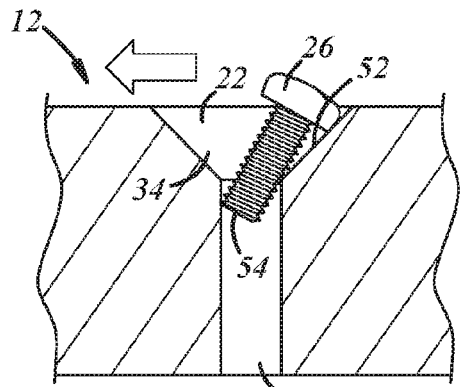
FIG. 9 is the view of FIG. 8 with the mechanical fastener moved further along the upper side of the parts holder and being received in the receptacle.

FIG. 9 illustrates such further movement. With the particularly illustrated proportions between the screw 26 and the receptacle 22, the screw slides down a wall 52 of the lead-in 34 such that the full diameter of a tip 54 of the screw enters the second portion 36 of the receptacle 22. This screw 26 will easily fall into place in the receptacle 22 into the desired orientation as in FIG. 7 without further agitation.

Figure 10:
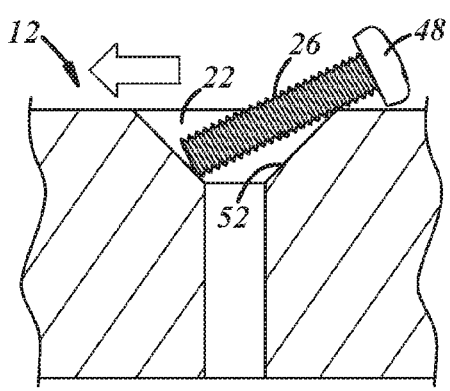
FIG. 10 is the view of the parts holder of FIGS. 7-9 with a longer mechanical fastener illustrated during movement along the upper side of the parts holder.

FIG. 10 illustrates a screw 26 of the same nominal diameters as that of FIGS. 7-9, but with a greater length. When encountering the same receptacle 22, the longer screw is too long to reach the critical position that the screw of FIG. 7 has reached—i.e., with the underside of the screw head 48 at the uppermost edge of the receptacle 22 where any further movement will cause the screw to slide down the wall 52 of the lead-in and be received in the desired orientation.

Figure 11:
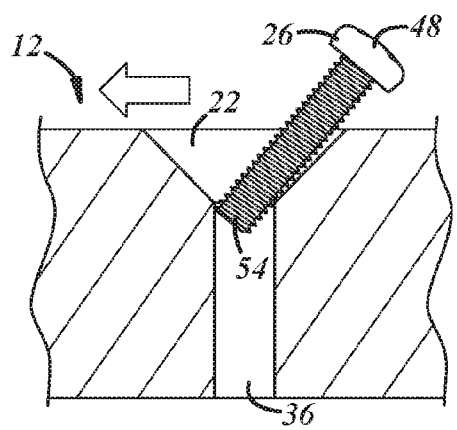
FIG. 11 is the view of FIG. 10 with the mechanical fastener being received in the receptacle.

FIG. 11 illustrates the screw 26 of FIG. 10 in a theoretical position with the full diameter of the tip 54 of the screw entering the second portion 36 of the receptacle 22. To achieve this, the head 48 of the screw 26 must be lifted away from the parts holder 12 as shown. A brush-type agitator is capable of this type of screw movement, as sufficiently compliant bristles will part to allow the screw head 48 to rise into the brush. But this is not a preferred condition because it lowers the probability that any given encounter of the screw 26 with one of the receptacles 22 will result in the screw being received and held by the receptacle.

For the illustrated screw 26 to be more easily received in the receptacle 22, the wall length W (FIG. 7) may be increased to a magnitude that allows the full diameter of the tip 54 of the screw to pass beyond the second end of the lead-in and into the second portion 36 of the receptacle with the head 48 of the screw resting along the wall of the lead-in. The magnitude of W may depend on other things, such as the diameter D3 of the second portion of the receptacle, the diameter D1 of the screw head, and the lead-in angle α, for example (see FIG. 7). Because of these other variables, there is no hard limit or dimensional relationship that can be assigned to the wall length W in all cases. In many cases, however, configuring the receptacle 22 to have a wall length W that is greater than or equal to the length L2 (FIG. 7) of the body of the screw is suitable.

It is also useful to have a wall length W sufficiently large that the underside of the screw head rests along the wall 52 such that the wall functions as a centering feature for the held screw 26. This differentiates the illustrated lead-in from a smaller chamfer which, while possibly useful as a lead-in, does not act as a centering feature if the outer diameter of the underside of the screw head rests on the upper surface of the parts holder. Centering of the screw 26 so that it is coaxial with the cylindrical passage of the receptacle, or so that the exact position of the longitudinal axis of the screw with respect to the parts holder is otherwise known, is useful in subsequent operations such as when the filled parts holder proceeds to an assembly cell or station where each screw will be removed from the parts holder by a robot or pick-and-place unit. Also, when the angles wall 52 provides such a centering function, the diameter D3 (FIG. 7) of the receptacle need not provide a centering function, and the dimension D3 can be formed to be much larger than the diameter of the screw body 50. Indeed, the diameter D3 of the lower portion of the receptacle can be made nearly as large as the diameter D1 of the screw head, which provides a large amount of clearance between the screw body and the lower portion of the receptacle, allowing for easier and freer movement of the screw to fall into the receptacle.

This solves an additional problem compared to a process in which the size of a hole with a small lead-in or no lead-in is relied on for centering purposes. In such cases, if the hole surrounding the screw shaft is too small—i.e., D3 is just larger than D2—filling the hole and removing the screw from the hole will be difficult and prone to jamming. Conversely, if the hole surrounding the screw shaft is made large enough to avoid these problems, then the location of the center of each part will be unpredictable and complex, and expensive adaptive systems (e.g., vision systems) would be required to find where the screw is located with respect to the center of the receptacle in order to remove it and engage the screw without failure.

Figure 12:
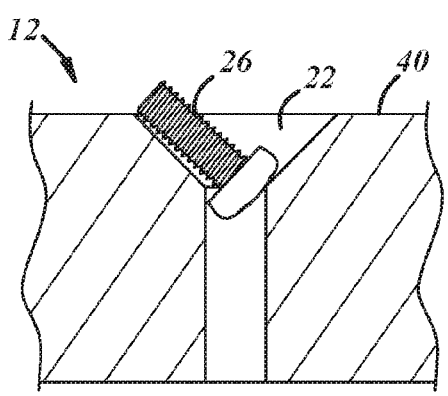
FIG. 12 is the view of the parts holder of FIG. 7 illustrating an unheld mechanical fastener in the receptacle.

FIG. 12 illustrates another situation that arises during operation of the parts organizer. In this example, the screw 26 is resting in the receptacle 22 but is not in the desired orientation. In this case, further operation of the agitator will sweep the screw 26 out of the receptacle 22 and further along the upper side of the parts holder 12 until another receptacle is encountered. This is due in part to the receptacle 22 being sized so that a screw 26 in the receptacle in an undesired orientation protrudes above the upper surface 40 of the parts holder 12, as shown, while a screw in the receptacle in the desired orientation lies entirely below the upper surface of the holder. This is not a requirement for proper operation of the parts organizer, but it can improve performance by ensuring that parts in the desired orientation are not swept out of the receptacles and ensuring that unheld parts in a receptacle can be moved further along the upper side of the parts holder. In some cases, unheld parts in a receptacle that do not protrude above the upper surface of the parts holder can be moved along due to the bristles of the brush reaching into the receptacle during operation. Similar limitations can be placed on the depth of the lead-in 34, depending on the lead-in angle α.

The lead-in angle α (FIG. 7) also affects the parts organizing operation. For instance, a lead-in angle α that is too large (i.e., a shallow lead-in) may not facilitate the sliding movement described above in conjunction with FIG. 9 when a part 26 encounters a receptacle 22 in an otherwise favorable orientation—i.e., rather than falling into the receptacle, the part 26 may instead be swept away from the receptacle and lose an opportunity to be received by the receptacle. A lead-in angle α that is too small (i.e., a steep lead-in) may not facilitate removal of an improperly oriented part from the receptacle 22. In other words, the lead-in also acts as a sort of "lead-out" feature when the agitator operates to move unheld parts out of a receptacle. Though not limited to this range, a lead-in angle α in a range from 30 degrees to 60 degrees may suitable. In one embodiment, the lead-in angle is in a range from 40 degrees to 50 degrees. In one particular implementation, the lead-in angle is 41.5 degrees, and 45 degrees in another implementation.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A parts organizer for organizing a plurality of randomly oriented parts, comprising:

a parts holder comprising an upper side and a plurality of receptacles opening on said upper side, each one of the receptacles being configured to receive and hold an individual one of the parts in a desired orientation and in spaced relation from other individual ones of the parts being held in the desired orientation by respective different ones of the receptacles;

an agitator operable to move parts from the plurality of randomly oriented parts that are not held by one of the receptacles in the desired orientation along the upper side of the parts holder; and a retaining wall configured to retain unheld parts at the upper side of the parts holder while the agitator moves the unheld parts along the upper side of the parts holder, wherein the parts holder is removable from the organizer when each one of the receptacles is holding one of the parts.

2. An organizer as defined in claim 1, further comprising a container that contains the plurality of randomly oriented parts in bulk form, wherein the parts holder is configured to receive at least some of the plurality of randomly oriented parts at the upper side of the parts holder to be moved along the upper side of the parts holder by the agitator.

3. An organizer as defined in claim 1, wherein the parts holder and agitator are moveable relative to one another between a parts receiving condition, in which at least some of the plurality of randomly oriented parts are received at the upper side of the parts holder, and a parts organizing condition, in which the agitator operates to move unheld received parts along the upper side of the parts holder.

4. An organizer as defined in claim 1, wherein the agitator does not touch the parts at the upper side of the parts holder when in a parts receiving condition, and the agitator touches the parts at the upper side of the parts holder when in a parts organizing condition.

5. An organizer as defined in claim 1, further comprising a container that contains the plurality of randomly oriented parts in bulk form, wherein at least a portion of the upper side of the parts holder is immersed in the plurality of randomly oriented parts in the container when in a parts receiving condition.

6. An organizer as defined in claim 1, wherein the agitator is configured to physically contact the unheld parts that the agitator moves along the upper side of the parts holder.

7. An organizer as defined in claim 1, wherein the agitator is non-vibrational.

8. An organizer as defined in claim 1, wherein the agitator comprises a brush having bristles that move with respect to the parts holder to apply forces to the unheld parts that the agitator moves along the upper side of the parts holder.

9. An organizer as defined in claim 1, wherein the agitator rotates about an axis in a rotational direction and moves the unheld parts along the upper side of the parts holder in said rotational direction.

10. An organizer as defined in claim 9, wherein the retaining wall is round and concentric with said axis.

11. An organizer as defined in claim 1, wherein the retaining wall is changeable between a closed position, in which the retaining wall retains unheld parts at the upper side of the parts holder while the agitator moves the unheld parts along the upper side of the parts holder, and an open position, in which the agitator operates to move unheld parts at the upper side of the parts holder off of the upper side of the parts holder.

12. An organizer as defined in claim 1, wherein each of the parts has an elongate axis and the agitator is operable to reorient parts at empty receptacles during movement along the upper side of the parts holder so that the elongate axis of each reoriented part is in a vertical orientation and each reoriented part fills one of the receptacles.

13. An organizer as defined in claim 1, wherein the parts are mechanical fasteners each having a head and a coaxial shaft extending from the head, each receptacle comprising a tubular passage and a chamfer having a depth greater than an axial length of the heads of the fasteners so that the head of a fastener held in the desired orientation lies below an upper surface of the parts holder.

14. A parts organizer for organizing a plurality of randomly oriented parts, comprising:

a parts holder comprising an upper side and a plurality of receptacles opening on said upper side, each one of the receptacles being configured to receive and hold an individual one of the parts in a desired orientation and in spaced relation from other individual ones of the parts being held in the desired orientation by respective different ones of the receptacles;

an agitator operable to move parts from the plurality of randomly oriented parts that are not held by one of the receptacles in the desired orientation along the upper side of the parts holder; and a retaining wall configured to retain unheld parts at the upper side of the parts holder while the agitator moves the unheld parts along the upper side of the parts holder, wherein the parts holder and agitator are moveable relative to one another between a parts receiving condition, in which at least some of the plurality of randomly oriented parts are received at the upper side of the parts holder, and a parts organizing condition, in which the agitator operates to move unheld received parts along the upper side of the parts holder, and wherein the agitator does not touch the parts received at the upper side of the parts holder when in the parts receiving condition, and the agitator touches the parts received at the upper side of the parts holder when in the parts organizing condition.

15. An organizer as defined in claim 14, wherein the agitator comprises a brush having bristles that touch the parts and move with respect to the parts holder to move the unheld along the upper side of the parts holder.

16. A parts organizer for organizing a plurality of randomly oriented parts, comprising:

a parts holder comprising an upper side and a plurality of receptacles opening on said upper side, each one of the receptacles being configured to receive and hold an individual one of the parts in a desired orientation and in spaced relation from other individual ones of the parts being held in the desired orientation by respective different ones of the receptacles;

an agitator operable to move parts from the plurality of randomly oriented parts that are not held by one of the receptacles in the desired orientation along the upper side of the parts holder;

a retaining wall configured to retain unheld parts at the upper side of the parts holder while the agitator moves the unheld parts along the upper side of the parts holder; and a container that contains the plurality of randomly oriented parts in bulk form, the parts holder being movable relative to the container, wherein the parts holder and agitator are moveable relative to one another between a parts receiving condition, in which at least some of the plurality of randomly oriented parts are received at the upper side of the parts holder, and a parts organizing condition, in which the agitator operates to move unheld received parts along the upper side of the parts holder, and wherein at least a portion of the upper side of the parts holder is immersed in the plurality of randomly oriented parts in the container when in the parts receiving condition and not immersed in the plurality of randomly oriented parts in the container when in the parts organizing condition.

17. A parts organizer for organizing a plurality of randomly oriented parts, comprising:

a parts holder comprising an upper side and a plurality of receptacles opening on said upper side, each one of the receptacles being configured to receive and hold an individual one of the parts in a desired orientation and in spaced relation from other individual ones of the parts being held in the desired orientation by respective different ones of the receptacles;

an agitator operable to move parts from the plurality of randomly oriented parts that are not held by one of the receptacles in the desired orientation along the upper side of the parts holder; and a retaining wall configured to retain unheld parts at the upper side of the parts holder while the agitator moves the unheld parts along the upper side of the parts holder, wherein the retaining wall is changeable between a closed position, in which the retaining wall retains unheld parts at the upper side of the parts holder while the agitator moves the unheld parts along the upper side of the parts holder, and an open position, in which the agitator operates to move unheld parts at the upper side of the parts holder off of the upper side of the parts holder.

18. An organizer as defined in claim 17, wherein the agitator comprises a brush having bristles that move with respect to the parts holder to apply forces to the unheld parts that the agitator moves along and off of the upper side of the parts holder.

19. A parts organizer for organizing a plurality of randomly oriented parts, comprising:

a parts holder comprising an upper side and a plurality of receptacles opening on said upper side, each one of the receptacles being configured to receive and hold an individual one of the parts in a desired orientation and in spaced relation from other individual ones of the parts being held in the desired orientation by respective different ones of the receptacles;

an agitator operable to move parts from the plurality of randomly oriented parts that are not held by one of the receptacles in the desired orientation along the upper side of the parts holder; and a retaining wall configured to retain unheld parts at the upper side of the parts holder while the agitator moves the unheld parts along the upper side of the parts holder, wherein each of the parts has a first end and a smaller second end, each one of the receptacles having a first portion at the upper side of the parts holder and a second portion extending away from the first portion toward an opposite side of the parts holder, each second portion being sized to exclude the first ends of the parts and to allow one of the second ends of the parts to extend into the second portion to be held in the respective receptacle in the desired orientation, thereby preventing movement of held parts out of the receptacles when the agitator operates to move unheld parts along the upper side of the parts holder.

20. An organizer as defined in claim 19, wherein the agitator comprises a brush having bristles that move with respect to the parts holder to apply forces to the unheld parts that the agitator moves along the upper side of the parts holder.

* * * * *